United States Patent [19]
Jorgensen

[11] Patent Number: 6,164,475
[45] Date of Patent: Dec. 26, 2000

[54] ELECTRICAL BOX FOR FAN OR FIXTURE SUPPORT

[75] Inventor: Robert W. Jorgensen, Niles, Mich.

[73] Assignee: Hubbell Incorporated, Orange, Conn.

[21] Appl. No.: 09/356,420

[22] Filed: Jul. 16, 1999

[51] Int. Cl.[7] .................................................. H02G 3/00
[52] U.S. Cl. .............................. 220/3.9; 220/3.3; 220/3.8
[58] Field of Search .............................. 220/3.3, 3.8, 3.9, 220/3.7, 3.92, 3.94

[56] References Cited

U.S. PATENT DOCUMENTS

| | | | |
|---|---|---|---|
| 2,316,389 | 4/1943 | Atkinson | 220/3.9 X |
| 2,782,954 | 2/1957 | Antonucci | 220/3.8 X |
| 3,601,276 | 8/1971 | Culpepper | 220/3.8 X |
| 4,645,089 | 2/1987 | Horsley | 220/3.9 X |
| 4,880,128 | 11/1989 | Jorgensen . | |
| 4,892,211 | 1/1990 | Jorgensen . | |
| 5,594,207 | 1/1997 | Fabian et al. . | |
| 5,693,909 | 12/1997 | McEwen | 220/3.3 X |
| 5,857,581 | 1/1999 | Jorgensen . | |
| 5,988,421 | 11/1999 | Jorgensen | 220/3.3 |

*Primary Examiner*—Steven Pollard
*Attorney, Agent, or Firm*—Alfred N. Goodman; Jeffrey J. Howell

[57] ABSTRACT

An electrical box for mounting a ceiling fan or a light fixture in which the electrical box is the sole support for the fan or fixture. The electrical box has mounting holes on its sides for receiving fasteners for securing the electrical box directly to a joist, beam, or other structural support member. Preferably, the fasteners are nails to provide an easy installation. The electrical box has flanges with both fixture and fan mounting holes as well as holes for mounting a cover. A cover can be mounted directly to the electrical box. The cover can be the attaching element between the electrical box and the fan or fixture.

16 Claims, 4 Drawing Sheets

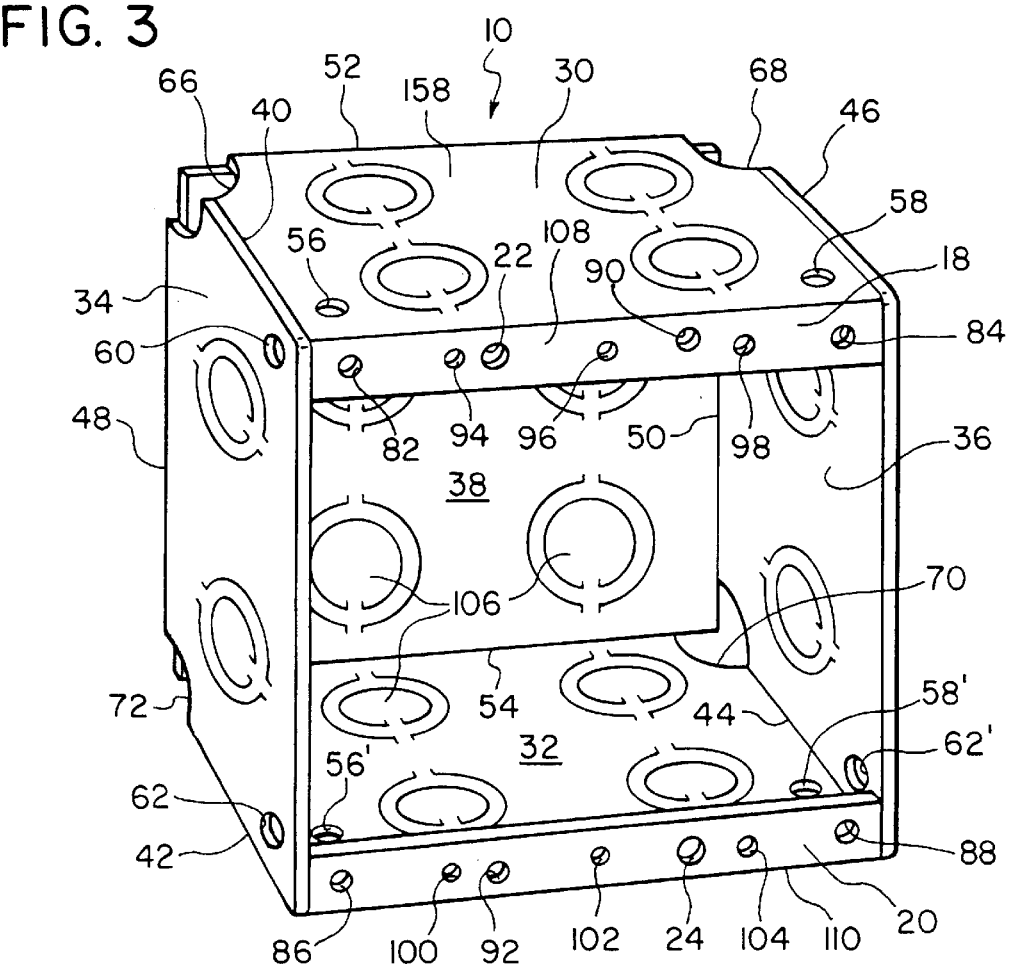

ELECTRICAL BOX FOR FAN OR FIXTURE SUPPORT

FIELD OF THE INVENTION

The invention relates to an electrical box for mounting a ceiling fan, light fixture, or other devices or covers thereto, in which the electrical box is the support for the ceiling fan or light fixture. More particularly, the invention is directed to an electrical box that has mounting holes therein for receiving fasteners extending completely through the box for securing the box directly to a joist or other structural support member such that the box can support the dynamic loads of a ceiling fan. The invention also relates to an adapter for mounting a fan or fixture to an electrical box.

BACKGROUND OF THE INVENTION

Ceiling fans have become increasingly popular for use in homes as well as businesses such as restaurants and offices. Electrical boxes are often used as the only means of supporting fans or light fixtures to a structural member in a ceiling or a wall. Generally, electrical boxes are designed for supporting light fixtures only, but are used for both light fixtures and fans. However, due to the vibratory loads generated by ceiling fans, boxes not specifically designed for supporting fans often fail structually when fans have been attached thereto.

Accordingly, electrical boxes must be designed to securely support fans and comply with the pertinent requirements of Underwriters Laboratories. Although boxes that securely support fans exist, often they are somewhat complicated to attach to the structural member in the ceiling or wall and require very specific hardware.

Examples of some prior electrical boxes are shown in the following U.S. Pat. Nos.: 4,880,128 and 4,892,211 to Jorgensen; 5,594,207 to Fabian et al.; and 5,857,581 to Jorgensen.

Accordingly, there exists a need for an electrical box that securely supports a ceiling fan and that is easy to mount to building structure. Additionally, there exists a need for an electrical box that enables easy attachment of the light fixture or fan to the box. This invention addresses these needs of the prior art as well as other needs and problems that will become apparent to those skilled in the art from this disclosure.

SUMMARY OF THE INVENTION

Accordingly, it is a object of the present invention to provide an electrical box that securely supports a ceiling fan.

Another object of the present invention is to provide an electrical box to which a light fixture or ceiling fan can be easily mounted.

Still another object of the present invention is to provide an electrical box which is easily mounted to a building support; such as, a joist or beam.

A further object of the present invention is to facilitate the adaptation of electrical boxes for use as a support for ceiling fans or light fixtures.

The foregoing objects are basically attained by an electrical box for supporting a fan or fixture, comprising a base; and a wall coupled to and extending from the base, the wall having a first side portion and a second side portion, with the base portion between the first and second side portions, each of the first and second side portions having a plurality of first mounting holes, each of the first mounting holes of the first side portion being aligned with a corresponding first mounting hole on the second side portion forming a first mounting hole pair, each of the first mounting hole pairs being capable of receiving a fastener for fastening the electrical box to a structure, the wall further having first and second attaching portions, the first and second attaching portions being spaced on opposite sides of the base and the first attaching portion extending from the wall toward each other, and the first and second attaching portions being capable of supporting a fan or a fixture.

The objects are further attained by providing an assembly for supporting a fan or fixture, comprising an electrical box having a base and a wall coupled to and extending from the base, the wall having a first side portion and a second side portion, with the base portion between the first and second side portions, each of the first and second side portions having a plurality of mounting holes each of the mounting holes of the first side portion being aligned with a corresponding mounting hole on the second side portion forming a mounting hole pair; and a plurality of fasteners, each of the plurality of fasteners being positioned in one of the mounting hole pairs and extending through the first side portion, over the base, and through the second side portion for fastening the electrical box to a structure, the wall further having first and second attaching portions, the first and second attaching portions being spaced on opposite sides of the base and extending from the wall toward each other, and the first and second attaching portions being capable of supporting a fan or a fixture.

The objects are still further attained by providing an assembly for supporting a fan or fixture, comprising: an electrical box having a base and a wall coupled to and extending from the base, the wall having first and second attaching portions, the first and second attaching portions being spaced on opposite sides of the base and extending from the wall toward each other, and each of the first and second attaching portions having a plurality of openings; a plurality of fasteners; and a mounting member having a plurality of holes and an aperture extending therethrough, the mounting member having third and fourth attaching portions being spaced on opposite sides of the aperture, and being capable of supporting a fan or a fixture, and each of the plurality of fasteners extending through one of the plurality of holes and through one of the plurality of openings to secure the mounting member to the electrical box.

Other objects, advantages, and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure:

FIG. 3 is a front, side, bottom perspective view of the electrical box in accordance with the present invention and shown in FIGS. 1 and 2, illustrating the electrical box alone;

FIG. 4 is a side elevational view of the electrical box in accordance with the present invention and illustrated in FIG. 3, schematically illustrating a fan or fixture attached thereto;

FIG. 5 is a front elevational view of the electrical box in accordance with the present invention and illustrated in FIG. 3, schematically illustrating a fan or fixture attached thereto;

DETAILED DESCRIPTION OF THE INVENTION

Figure 1:
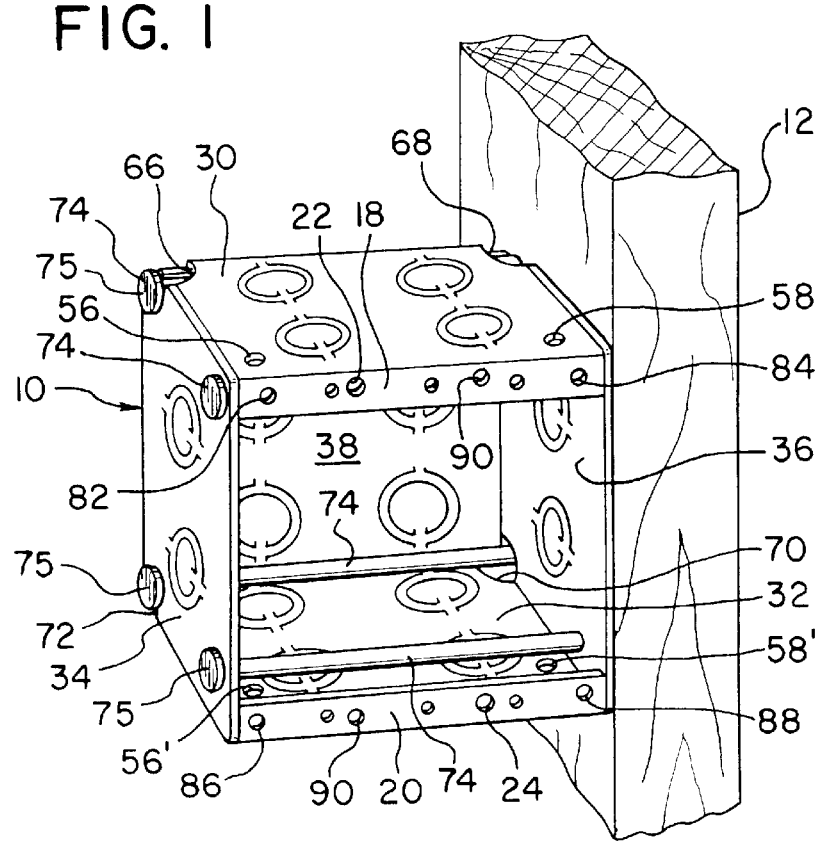
FIG. 1 is a front, side, bottom perspective view of an electrical box in accordance with the present invention, shown mounted to a joist or beam in a first manner.
Figure 2:
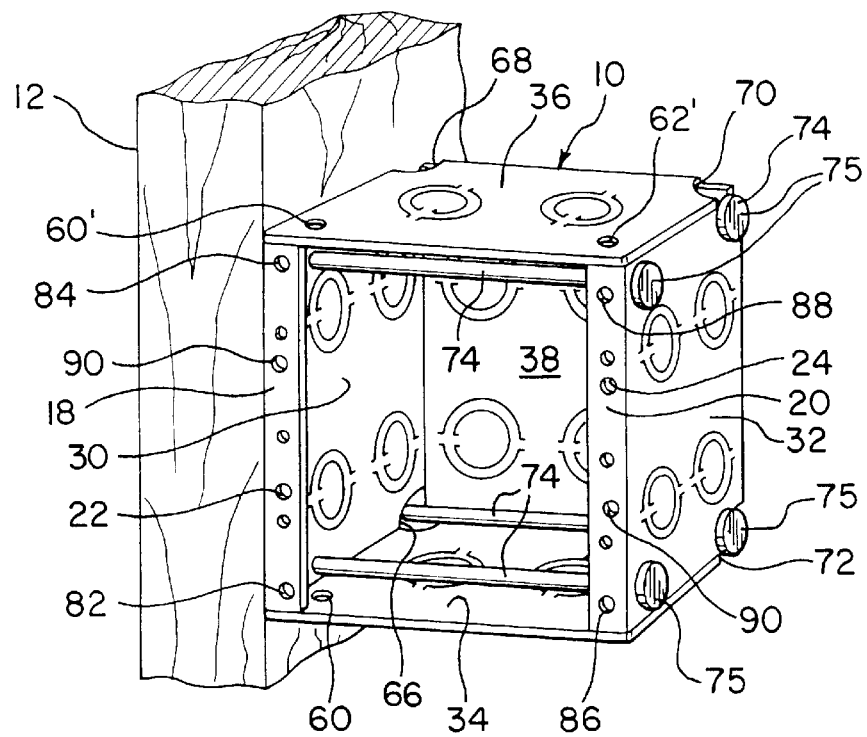
FIG. 2 is a side, front, bottom perspective view of the electrical box shown in FIG. 1 and in accordance with the present invention, shown mounted to a joist or beam in a second manner.

As seen in FIGS. 1 and 2, an electrical box 10 in accordance with the present invention is illustrated as being rigidly secured to a building support such as a joist or beam 12. Box 10 is intended to be the sole support for a ceiling fan or a light fixture 13, which are illustrated schematically in FIGS. 4 and 5. FIG. 1 illustrates a first orientation of secured box 10 with respect to beam 12 and FIG. 2 illustrates a second orientation of secured box 10 with respect to beam 12.

Box 10 can be formed of any appropriate material, but is preferably made from metal; such as, a sheet of galvanized steel.

As seen in FIGS. 1–5, the electrical box 10 is essentially in the form of a parallelepiped, or box, having side portions 30, 32, 34, 36, fixedly attached to a top or main portion 38. The side portions 30, 32, 34, 36 may be welded to each other and to the top portion 38 along the side edges 40, 42, 44, 46 and the top edges 48, 50, 52, 54. Alternatively, the first and second side portions or the front and rear portions 30, 32 can be integrally formed with the top portion 38, or all or some of the side portions 30, 32, 34, 36 may be integrally formed with the top portion 38 and welded or otherwise fixedly attached along the side edges 40, 42, 44, 46. If formed integrally, the side portions 30, 32, 34, 36 may be bent along top edges 48, 50, 52, 54 so that the sides 30, 32, 34, 36 are essentially perpendicular to the top portion 38 to form box 10. Instead of being welded, the edges 40, 42, 44 and 46 may be fixedly attached by being soldered, crimped, bonded with adhesive or other appropriate joining means. Alternatively, the edges 40, 42, 44 and 46 may be removeably attached using screws, brackets, clamps, braces, or other appropriate attachment means. When assembled, side portions 30, 32, 34 and 36 form a wall extending around the perimeter of top portion 38. Also, the side portions 30, 32, 34 and 36 can form various shapes while extending around top portion 38 in addition to a parallelepiped shape, such as generally circular, octagonal, etc.

As seen in FIGS. 1–3, electrical box 10 includes a pair of substantially parallel first and second attaching portions or flanges 18, 20. Flanges 18, 20 extend from the first and second side portions 30, 32, and are essentially parallel to the top portion 38. Flanges 18, 20 may be attached to the first and second side portions 30, 32, along side flange edges 108, 110. Optionally, the flanges 18, 20 may also be attached to the third and fourth side portions 34, 36. Flanges 18, 20 project inwardly substantially perpendicular to the side portions 30, 32, 34, 36. Attachment of the flanges 18, 20 to the side portions may be accomplished using any of the attaching means discussed above. Preferably, the flanges 18, 20 are integral with the first and second side portions 30, 32 and are connected to side portions 30 and 32 by fold lines.

Each of the flanges 18, 20 have a threaded fan bracket mounting hole 22, 24, respectively. Fan bracket mounting holes 22, 24 each threadedly receive a respective fan mounting fastener; such as a screw, which mount the ceiling fan to the electrical box 10.

Each flange 18, 20 contains a variety of holes for the attachment of various components. Each of the holes on flanges 18 and 20 are adapted to receive fasteners, which attach the various components to box 10. Preferably the holes of flanges 18 and 20 are threaded to receive threaded fasteners, such as screws. Alternatively, the holes can be formed in other manners, such as being punched, and self-tapping screws used to fasten a component to box 10.

Fan bracket mounting holes 22, 24 each threadedly receive a respective fan mounting screw which mounts the ceiling fan to the electrical box 10. Due to the spacing of flanges 18 and 20 and the typical spacing between the mounting holes on a typical ceiling fan, holes 22 and 24 are aligned along an axis which extends between flanges 18 and 20 and is inclined with respect to both flanges 18 and 20.

Each flange 18 and 20 also has a light fixture mounting hole 90 and 92, respectively. Fixture mounting holes are each, preferably, threaded to receive a respective fixture mounting fastener or screw which mounts the fixture to box 10. Due to the spacing of flanges 18 and 20 and the typical spacing between the mounting holes on a typical light fixture, holes 90 and 92 are aligned along an axis which extends between flanges 18 and 20 and is inclined with respect to both flanges 18 and 20.

Fan mounting holes 22 and 24 and fixture mounting holes 90 and 92 are arranged such that the respective axes extending between each of the mounting holes of each respective pair of mounting holes intersects. The basic concept of having both a fan and a fixture mounting hole on a common flange is disclosed in U.S. Pat. No. 5,857,581 to Jorgensen. U.S. Pat. No. 5,857,581 to Jorgensen is hereby incorporated herein by reference.

Holes in a typical fan housing will align with fan bracket mounting holes 22 and 24, each of the fan bracket mounting holes being on opposing flanges 18, 20. In this manner each fan mounting screw passes through a fan housing hole and attaches to one of the fan bracket mounting holes 22 and 24, mounting the fan housing to the electrical box 10. Preferably, fan bracket mounting holes 22, 24 are size 10–32 holes, since that size hole receives the typical screw for direct mounting of a conventional ceiling fan bracket. Preferably, fixture bracket mounting holes 90 and 92 are size 8–32 holes, since that size hole receives the typical screw for direct mounting of a conventional lighting fixture bracket.

Flanges 18, 20 contain additional holes which are spaced to accommodate other components. Adapter mounting holes 82, 84, 86, 88 are preferably for mounting a standard cover or cover adapter to the electrical box 10. Holes 82 and 84 are positioned at opposite ends of flange 18 and holes 86 and 88 are positioned at opposite ends of flange 20. Holes 82, 84, 86, 88 are spaced and arranged for mating with mounting holes of various covers, which can be attached to box 10. Preferably, holes 82, 84, 86, 88 are 8–32 threaded holes.

Figure 6:
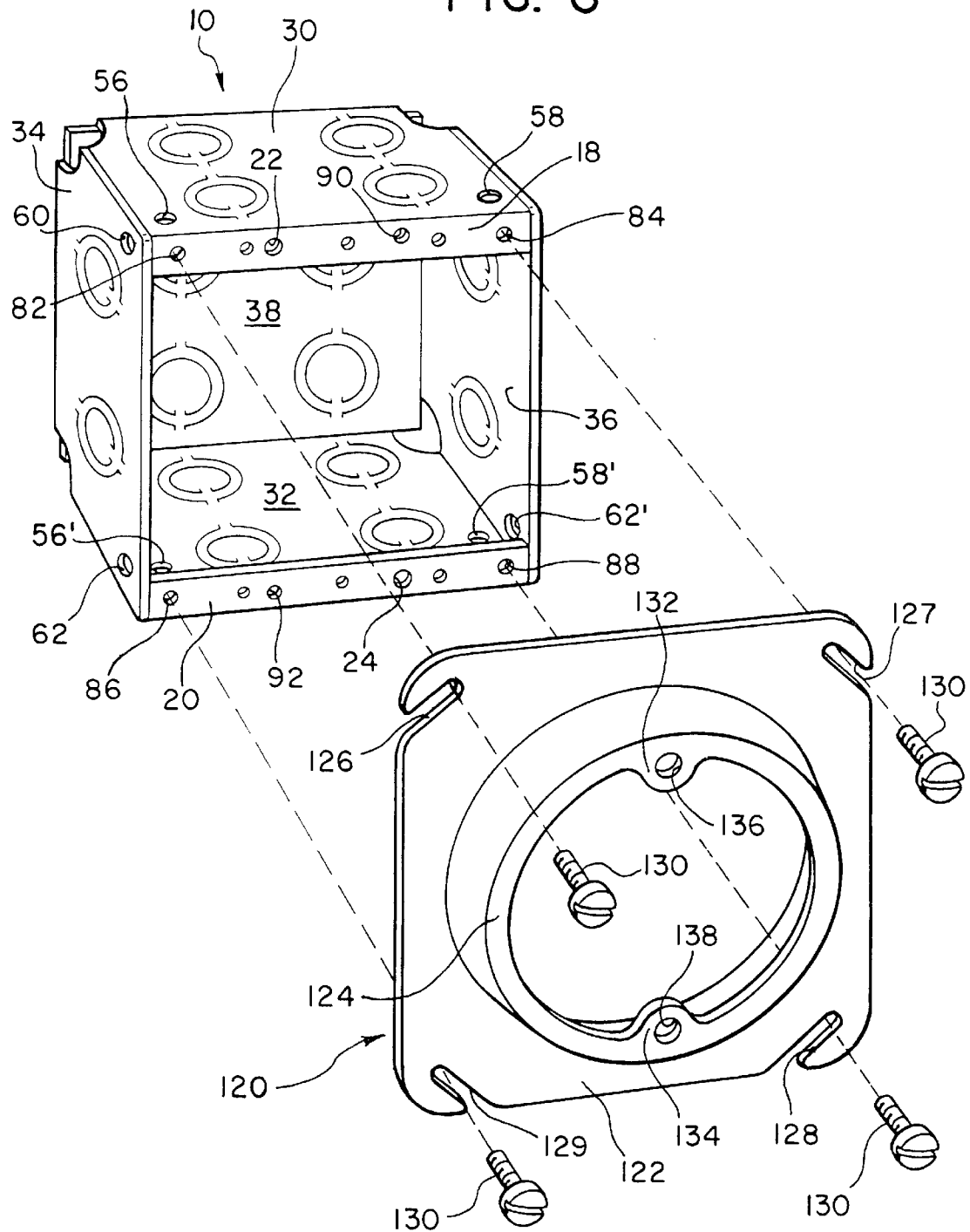
FIG. 6 is an exploded perspective view of an assembly in accordance with the present invention including the electrical box of the present invention and as illustrated in FIG. 3 and a cover plate for supporting a fan or light fixture and for attaching to the electrical box by fasteners.

FIG. 6 illustrates a cover 120, which is only one of the many types of covers that can be utilized with the invention. The cover may be flat, raised, square to round, exposed work covers, device covers, or other covers known in the industry. Typical covers that can be used with box 10 include standard four inch covers. As seen in FIG. 6, cover 120 has a flat, generally rectangular base 122 and a round mounting portion 124. Base 122 is approximately the same size as top portion 38 and when attached to box 10, can cover flanges 18 and 20 as well as enclose the opening between flanges 18 and 20. Base 122 has four mounting slots 126, 127, 128 and 129 that are sized and oriented as known in the art. Each slot 126–129 receives one mounting fastener 130, which is preferably a 8–32 screw. Each of the four screws 130 extends through one of the slots 126–129 and through one of the mounting holes 82, 84, 86, 88 to securely connect cover to box 10.

Mounting portion 124 has two mounting flanges 132 and 134, each having a mounting aperture 136 and 138 extending completely therethrough. Mounting apertures 136 and 138 are preferably 8–32 threaded holes if a light fixture is intended to be mounted on cover 120, and apertures 136 and 138 are preferably 10–32 threaded holes if a fan is intended to be mounted on cover 120. In effect, cover 120 provides an adapter for attaching a fan or a fixture to box 10. Instead of the fan or fixture being directly connected to box 10 as discussed above, alternatively, through the use of the cover 120, the fan or fixture can be mounted to the cover 120 and the cover mounted, in turn, to the box 10. The use of cover 120 in this manner can decrease the hole required in the adjacent wall or ceiling. For example, if the fan or fixture is directly mounted to box 10, a square hole is required in a ceiling to access the square box 10. However, if cover 120 is used, a smaller round opening corresponding to the round mounting portion 124 can be made in the ceiling. Cover 120 can be used with box 10 regardless of the manner in which box 10 is secured to joist 12.

Device support mounting holes 94, 96, 98 are mounted on flange 18 and corresponding device support mounting holes 100, 102 and 104 are mounted on flange 20. These mounting holes are preferably 6–32 holes and may be used for the direct mounting of electrical devices such as switches or other known devices. It will be recognized that the size and threading of all the holes on both flanges 18 and 20 can be changed to accommodate fasteners other than screw as well as fasteners of different sizes to accommodate the mounting of different types of apparatus.

Electrical box 10 is designed to be mounted in number of ways. One of the beneficial characteristics of box 10 is its ability to be simply nailed to joist 12 in two different orientations. For this purpose, side portions 30, 32, 34 and 36 are provided with mounting holes. Each side portion 30, 32, 34, 36 contains a pair of mounting holes 56 and 56', 58 and 58', 60 and 60', and 62 and 62', respectively. Each mounting hole is located in close proximity to the corner adjacent to flanges 18 and 20. The mounting holes are clear of knockouts, and are preferably positioned to avoid interfering with any device mounted to the box. Each side portion 30, 32, 34 and 36 also has a portion of a support structure corner mounting hole 66, 68, 70 and 72 extending therethrough.

Each mounting hole is aligned with a mounting hole on an opposite side portion to permit one of four fasteners 74 to extend through one mounting hole in one side portion and through the aligned mounting hole in the opposite side portion. That is, for example, mounting hole 56 on the first side portion 30 is paired with mounting hole 56' on the second side portion 32 such that the two mounting holes 56, 56' form a mounting hole pair and are approximately aligned. Therefore, a fastener 74 can readily be positioned through the two holes 56, 56'. Similarly, the remaining mounting holes, 58 and 58', 60 and 60', and 62 and 62' are also coupled.

Figure 7:
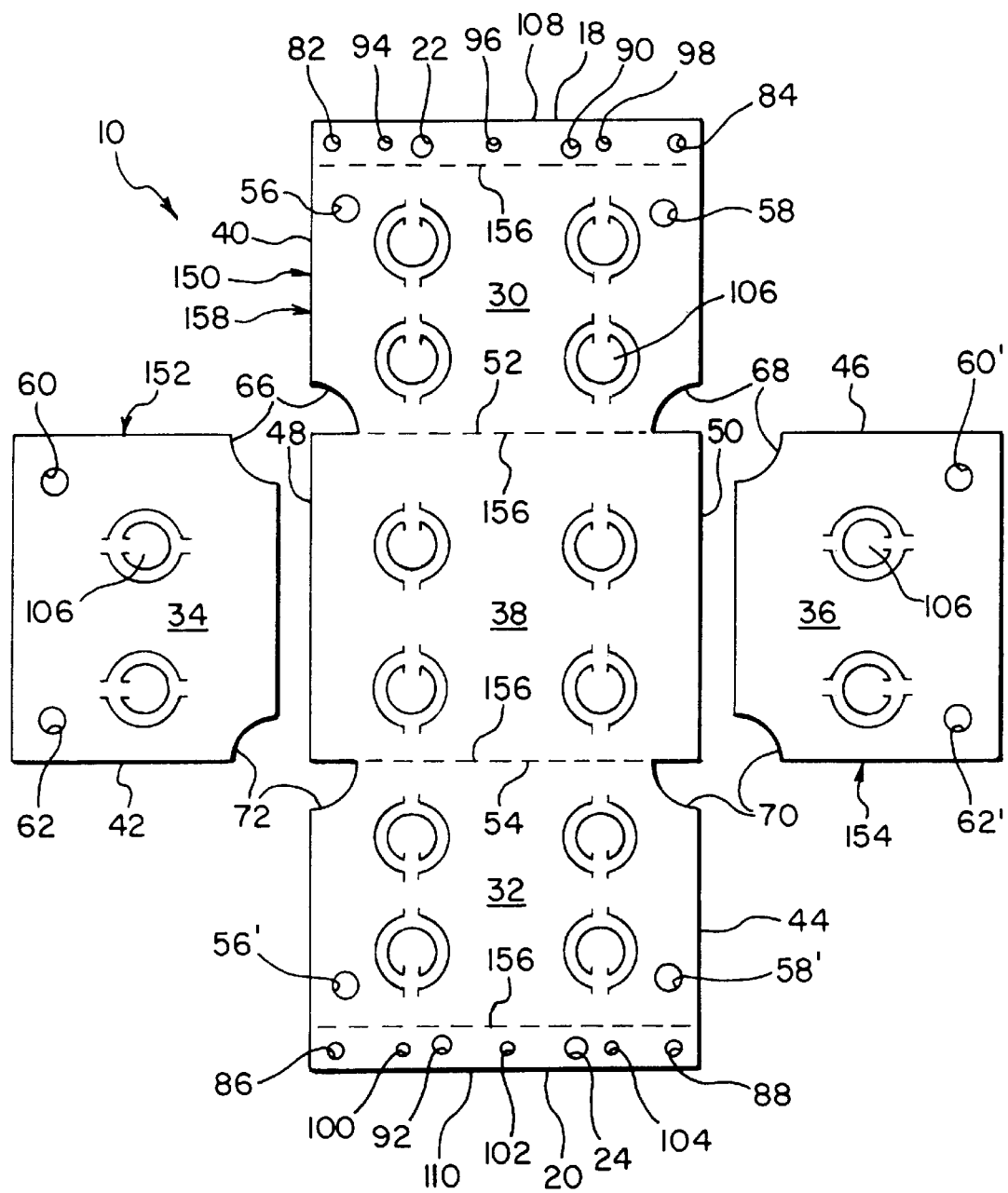
FIG. 7 is a plan view of three blanks for forming the electrical box in accordance with the present invention, the blanks illustrating the inside surfaces of the electrical box and illustrating the intended fold lines as dashed lines.

First through fourth support structure corner mounting holes 66, 68, 70, 72 are formed where the four corners of the top portion 38 joins with the first through fourth side portions 30, 32, 34, 36. In this manner, corner mounting holes located on adjacent sides edges form a pair of corner mounting holes that are aligned, permitting a relatively straight fastener to go through each pair of holes for mounting of the electrical box 10 to a support structure. Corner mounting holes 66, 68, 70 and 72 are slots formed by the absence of material at two of the four corners of side portions 30, 32, 34 and 36, that is, the corners furthest from flanges 18 and 20. This can simplify manufacturing of the elements of box 10. For example, the openings 66, 68, 70 and 72 can be formed when the blanks 150, 152 and 154 are formed as illustrated in FIG. 7.

Holes 66, 68, 70 and 72 are all similarly sized and shaped. However, any shape can be used so long as it permits the fastener 74 to extend through while being small enough to support the fastener 74. For example, holes 66, 68, 70 and 72 can be formed as eight circular holes, one hole on each side portion 30, 32, 34, 36, if desired.

Holes 66, 68, 70 and 72 are arranged such that each hole 66, 68, 70 and 72 can accept a fastener 74 in one of two directions, which are substantially perpendicular to each other. In other words, holes 66, 68, 70 and 72 are used regardless of whether box 10 is secured in its first orientation as illustrated in FIG. 1 or its second orientation as illustrated in FIG. 2. Each mounting hole 66, 68, 70 and 72 has two portions, each portion of each mounting hole 66, 68, 70 and 72 being a separate opening for one side portion 30, 32, 34 and 36, forming four mounting hole pairs and acting in substantially the same manner as one of the support structure mounting holes: such as 56 or 56'. The arrangement of holes 66, 68, 70 and 72 as extending into two side portions each, allows each hole 66, 68, 70 and 72 to be used regardless of the orientation of the box 10 when mounted.

The fasteners 74 are preferably barn nails having heads 75. Nails 74 are long enough to proceed completely through box 10 and through either a pair of mounting holes such as 56 and 56' or through a pair of corner holes or slots 66 and 68 or both to securely attach the electrical box 10 to a suitable support structure such as a wall stud or joist 12. It will be readily apparent that the fastener 74 may also be a screw, a bolt and nut combination, or any other suitable mounting hardware and that the holes in box 10 can be threaded or not to attach to their respective fastener 74, as needed or desired.

When mounting the electrical box 10 to a support structure, it is preferable that at least two fasteners 74 be used, and when a ceiling fan 14 is to be attached to the electrical box 10, it is still more preferable that four fasteners 74 be used to adequately support the fan 14. However, it should be understood that the number of fasteners 74 used to attach the electrical box 10 to the support structure will depend on the nature of the support structure, the type of fasteners 74 used, and the fixture or fan 14 to be mounted. Additionally, the orientation in which the box 10 is mounted can be dependent on user preference or for ease of installation.

The electrical box 10 also includes a number of knockout windows 106 which can be selectively broken off to create openings for passing electrical wires or conduit therethrough, as known in the art. Breakout windows 106 are positioned in each of the side portions 30, 32, 34, 36 and the top portion 38 and are preferably formed from the sheet metal of the side portions 30, 32, 34, 36 and top portion 38. Typically, breakout windows 106 project slightly inwardly or outwardly from the surrounding side portions 30, 32, 34, 36 and top portion 38.

Thus, electrical box 10 of the present invention is especially advantageous, as compared to known electrical boxes, for the multiple functionality as an electrical box, a ceiling fan support, a light fixture support, and an electrical device support. The novel addition of support structure mounting holes 56, 56', 58, 58', 60, 60', 62, 62' and support structure corner mounting holes 66, 68, 70, 72 permits this electrical box 10 to function as a ceiling fan support that can withstand the fatigue loading of a fan while being securely mounted to a beam or joist 12.

The use of electrical box 10 to support a ceiling fan or fixture in a secure position adjacent a joist 12 can be accomplished, for example, as follows. Electrical box 10 is aligned such that the flanges 18, 20 are substantially flush with the bottom surface of ceiling panels. Barn nails 74 are inserted through support structure mounting hole pairs 60–60' and 62–62' and support structure corner counting hole couples 66, 68, 70, 72 to secure the electrical box 10 to the joist 12 by hammering. This orientation is illustrated in FIG. 1. As illustrated in FIG. 2, the nails 74 are inserted through support structure mounting hole pairs 56–56' and 58–58' and support structure corner counting hole couples 66, 68, 70, 72 to result in a second orientation which is ninety degrees rotated about a central axis perpendicular to the top portion 38 and from the first orientation of FIG. 1. Thus, box 10 is attached to joist 12 in a manner which is faster, cheaper and easier than other electrical boxes.

The appropriate electrical connections can be made, then the fan or fixture mounting screws are then inserted through the fan or fixture housing to threadedly engage the fan bracket mounting holes 22, 24 or the fixture mounting holes 90 and 92. The weight of the ceiling fan or the fixture is thus supported from electrical box 10 by fan mounting screws 26, 28 or fixture mounting holes 90 and 92, respectively.

Although the invention has been described with respect to an electrical box and an embodiment for mounting a ceiling fan or a light fixture, electrical box 10 can be used to mount electrical fixtures of various types, for example, overhead lights, track for track lights, ceiling fans having integrated lights, audio-visual components including cameras, speakers and monitors, sensors and alarms, and other electrical components. Additionally, the electrical box 10 can be used to mount such fixtures and components to the walls or other surfaces of a building.

FIG. 7 illustrates the blanks 150, 152 and 154 which may be used to form the box 10. Blank 150 is a main blank which is folded at fold lines 156 to form the middle section 158 of electrical box 10. Once folded, middle section 158 provides sides 30 and 32 along with top portion 38 and flanges 18 and 20 as a one-piece, unitary member. Then side portions 34 and 36 formed by blanks 152 and 154 can be attached to middle section 158. Box 10 can be made in other ways. For example, blanks 150, 152, and 154 can be formed as one blank which is folded to form box 10, by integrally forming the blanks 152 and 154 as extensions of top portion 38 at the sections of portion 38 closest to each blank 152 and 154 as illustrated in FIG. 7.

Although box 10 has been describe with respect to the preferred embodiment of the invention, box 10 can be used in other ways and become even more universal and versatile. For instance, box 10 can be used in cement block construction where it would be held in place by cement blocks and mortar surrounding it, or box 10 can be supported only by a bracket (not shown) instead of fasteners 74. Additionally, although nails 74 eliminate the need for any additional supporting devices for box 10, supplemental brackets can be used in addition to or in place of fasteners 74.

While advantageous embodiments have been chosen to illustrate the invention, it will be understood by those skilled in the art that various changes and modifications can be made therein without departing from the scope of the invention as defined in the appended claims.

What is claimed is:

1. An electrical box for supporting a fan or a fixture, comprising;

a top portion;

a first side portion extending substantially perpendicular from said top portion;

a second side portion extending substantially perpendicular from said top portion and adjacent said first side portion;

a third side portion extending substantially perpendicular from said top portion, adjacent said second side portion and substantially parallel with said first side portion;

a fourth side portion extending substantially perpendicular from said top portion, adjacent said first and third side portions and substantially parallel with said second side portion;

a first corner mounting hole in said first and second side portions adjacent said top portion;

a second corner mounting hole in said second and third side portions adjacent said top portion, said first and second corner mounting holes forming a first mounting hole pair;

a third corner mounting hole in said third and fourth side portions adjacent said top portion, said second and third mounting holes forming a second mounting hole pair;

a fourth corner mounting hole in said first and fourth side portions adjacent said top portion, said third fourth mounting holes forming a third mounting hole pair and said first and fourth mounting holes forming a fourth mounting hole pair; and a first fastener positionable in at least one of said first mounting hole pair and said fourth mounting hole pair, securing said outlet box to a structure;

wherein positioning said first fastener in said fourth mounting hole pair relative to said first mounting hole pair rotates said outlet box approximately 90 degrees about a central axis perpendicular to said top portion.

2. An assembly according to claim 1, wherein a second fastener is positionable in at least one of said second mounting hole pair and third mounting hole pair, further securing said outlet box to said structure;

wherein positioning said second fastener in said second mounting hole pair relative to said third mounting hole pair rotates said outlet box approximately 90 degrees about a central axis perpendicular to said top portion.

3. An assembly according to claim 2, wherein each of said side portions has a plurality of structure mounting holes, each of said structure mounting holes from said first side portion aligning with a respective structure mounting hole on said third side portion and each of said structure mounting holes on said second side aligning with a respective structure mounting hole on said fourth side.

4. An assembly according to claim 1, wherein said first side portion has a first attaching portion, and said third side portion has a second attaching portion, said first and second attaching portions extending from said first and third side portions toward each other, and being capable of supporting a fan or a fixture.

5. An electrical box according to claim 4, wherein
said first and second attaching portions are flanges, and each of said flanges having at least one opening extending completely therethrough.

6. An electrical box according to claim 5, wherein
said at least one opening is a 10–32 threaded hole.

7. An electrical box according to claim 6, wherein
said at least one opening further includes an 8–32 threaded hole.

8. An assembly according to claim 5, wherein
said first and second attaching portions are flanges, and each of said flanges having at least one opening extending completely therethrough.

9. An electrical box according to claim 1, wherein
said electrical box is formed of rigid material.

10. An electrical box according to claim 9, wherein
said electrical box is made of metal.

11. An assembly according to claim 1, wherein
said side portions have a mounting member coupled thereto, said mounting member having an aperture extending therethrough and capable of supporting a fan or a fixture.

12. An electrical box for supporting a fan or a fixture, comprising;
 a top portion;
 a first side portion integrally formed with and extending substantially perpendicular from said top portion;
 a second side portion extending substantially perpendicular from said top portion and adjacent said first side portion;
 a third side portion integrally formed with and extending substantially perpendicular from said top portion, adjacent said second side portion and substantially parallel from said first side portion;
 a fourth side portion extending substantially perpendicular from said top portion, adjacent said first and third side portions and substantially parallel from said second side portion;
 a first corner mounting hole in said first and second side portions adjacent said top portion;
 a second corner mounting hole in said second and third side portions adjacent said top portion, said first and second corner mounting holes forming a first mounting hole pair;
 a third corner mounting hole in said third and fourth side portions adjacent said top portion, said second and third mounting holes forming a second mounting hole pair;
 a fourth corner mounting hole in said first and fourth side portions adjacent said top portion, said third fourth mounting holes forming a third mounting hole pair and said first and fourth mounting holes forming a fourth mounting hole pair;
 a first fastener receivable in at least one of said first mounting hole pair and said fourth mounting hole pair, securing said outlet box to a structure; and
 a second fastener receivable in at least one of said second mounting hole pair and third mounting hole pair, further securing said outlet box to said structure;
 wherein receiving said first fastener in said fourth mounting hole pair relative to said first mounting hole pair and receiving said second fastener in said second mounting hole pair relative to said third mounting hole pair rotates said outlet box approximately 90 degrees about a central axis perpendicular to said top portion;
 said first side portion having a first attaching portion, and said third side portion having a second attaching portion, said first and third side portions extending toward each other, and being capable of supporting a fan or a fixture.

13. An assembly according to claim 12, wherein
said electrical box is formed of metal.

14. An assembly according to claim 12, wherein
each of said side portions has a plurality of structure mounting holes, each of said structure mounting holes from said first side portion aligning with a respective structure mounting hole on said third side portion forming a plurality of first mounting hole pairs, and each of said structure mounting holes on said second side aligning with a respective structure mounting hole on said fourth side forming a plurality of second mounting hole pairs.

15. An assembly according to claim 14, wherein
a plurality of fasteners extend through said plurality of first mounting hole pairs.

16. An assembly according to claim 14, wherein
a plurality of fasteners extend through said plurality of second mounting hole pairs.

* * * * *